United States Patent
Sladecek et al.

(10) Patent No.: US 10,842,316 B2
(45) Date of Patent: Nov. 24, 2020

(54) APPARATUS AND METHOD FOR PREPARING FOOD INGREDIENTS WITH HOT AIR AND FLUID INTRODUCED THEREINTO

(71) Applicant: KONINKLIJKE PHILIPS N.V., Eindhoven (NL)

(72) Inventors: Marcel Sladecek, Eindhoven (NL); Jan Vaupot, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 183 days.

(21) Appl. No.: 15/767,363

(22) PCT Filed: Oct. 24, 2016

(86) PCT No.: PCT/EP2016/075519
§ 371 (c)(1),
(2) Date: Apr. 11, 2018

(87) PCT Pub. No.: WO2017/072068
PCT Pub. Date: May 4, 2017

(65) Prior Publication Data
US 2018/0289212 A1 Oct. 11, 2018

(30) Foreign Application Priority Data
Oct. 30, 2015 (EP) .................................. 15192250

(51) Int. Cl.
*A47J 37/06* (2006.01)
*F24C 15/32* (2006.01)

(52) U.S. Cl.
CPC ......... *A47J 37/0641* (2013.01); *F24C 15/325* (2013.01); *F24C 15/327* (2013.01)

(58) Field of Classification Search
CPC .... A47J 37/0641; F24C 15/325; F24C 15/327
See application file for complete search history.

(56) References Cited

U.S. PATENT DOCUMENTS

| 4,467,777 A | 8/1984 | Weber |
| 4,506,598 A * | 3/1985 | Meister ................. F24C 15/327 |
| | | 126/20 |
| 5,080,087 A * | 1/1992 | McFadden .............. F24C 3/087 |
| | | 126/20 |
| 5,438,916 A * | 8/1995 | Dornbush .............. A21B 3/132 |
| | | 99/393 |
| 2008/0105138 A1 | 5/2008 | Segato |
| 2008/0236404 A1 | 10/2008 | Ose |
| 2013/0180413 A1 | 7/2013 | Tjerkgaast |

FOREIGN PATENT DOCUMENTS

CN 104146190 A 11/2014

* cited by examiner

Primary Examiner — Shawntina T Fuqua

(57) ABSTRACT

The present application relates to an air based fryer (1) for preparing food ingredients. The air based fryer comprises a food preparation chamber (2), an air heater (3) for heating air in the food preparation chamber (2) and a fan (4) for circulating a flow of hot air in the food preparation chamber (2). The air-based fryer (1) further comprises a fluid inlet (5) for the introduction of a fluid directly into the circulating flow of hot air. This solution allows increasing the humidity of the flow of hot air results in superior quality food in terms of taste, texture, and aesthetics and increases the versatility of the air-based flyer.

20 Claims, 5 Drawing Sheets

APPARATUS AND METHOD FOR PREPARING FOOD INGREDIENTS WITH HOT AIR AND FLUID INTRODUCED THERETO

This application is the U.S. National Phase application under 35 U.S.C. § 371 of International Application No. PCT/EP2016/075519 filed on Oct. 24, 2016, which claims the benefit of International Application No. 15192250.7 filed on Oct. 30, 2015. These applications are hereby incorporated by reference herein.

FIELD OF THE INVENTION

The present invention generally relates to an apparatus for preparing food ingredients. In particular, the present invention relates to an apparatus for preparing food ingredients by moving a flow of hot air having a fluid introduced thereinto over the food ingredients to heat and cook those food ingredients in a food preparation chamber.

BACKGROUND OF THE INVENTION

An apparatus generally used in a domestic setting for preparing food ingredients to be consumed by circulating a flow of hot air around the food ingredients to heat and/or cook the food ingredients is known. This type of apparatus generally comprises an enclosed food preparation chamber into which food ingredients are placed. Hot air is then circulated around the food ingredients until the food ingredients are cooked.
Known apparatuses, which are known as "air-based fryers" use a high speed hot air flow which flows around the food ingredients to provide all round frying and to enable the frying of food ingredients with reduced amount of oil. Such an air-based fryer is for instance known from US2013/0180413.

However, the heating approach in air-based fryers only depends on circulating a flow of hot air and/or radiating heat directly to the target food ingredients. This heating approach can negatively affect the food ingredients in the food preparation chamber and result in dried or burnt food ingredients of inferior taste, texture, and appearance.

U.S. Pat. No. 4,506,598 discloses an oven, with a steam mode for thawing, heating, cooking and steaming by means of saturated steam generated by a steam generator, and a hot air mode for roasting and grilling, during which the steam generator is switched off. U.S. Pat. No. 5,080,087 discloses a gas fired convection oven with a convection heat source for roasting and baking and a radiant heat source for broiling. A steam generator may be provided with steam injection means to provide the oven with saturated steam for steaming and steam cooking.

CN104146190 discloses a cooker with a heating chamber and a steam generator to supply the heating chamber with steam. A predetermined steam temperature is maintained in the heating chamber to thereby increase vitamin C of the cooked food.

SUMMARY OF THE INVENTION

It is an object of the invention to provide an apparatus and method for preparing food ingredients which substantially alleviates or overcomes one or more of the problems mentioned above.

The invention is defined by the independent claims. The dependent claims define advantageous embodiments.

According to the present invention, there is provided an air-based fryer for preparing food ingredients comprising a food preparation chamber to receive the food ingredients, an air heater for heating air in the food preparation chamber, a fan for circulating a flow of hot air in the food preparation chamber, and a fluid inlet for the introduction of a fluid directly into the circulating flow of hot air.

This allows increasing the humidity of the flow of hot air, resulting in superior quality food in terms of taste, texture, and aesthetics and increases the versatility of the air-based fryer. Moreover, the fluid in the flow of hot air in the food preparation chamber prevents food ingredients from sticking to the surfaces and therefore, makes the air-based fryer easier to clean. By introducing the fluid directly into the circulating flow of hot air, use can be made of the flow itself to carry the fluid along and distribute it within the food preparation chamber in a fast and controlled manner.

The fluid may be a gas, e.g. saturated steam. This steam may be generated outside the food preparation chamber by separate heating means. Once introduced in the food preparation chamber, the steam may be heated further by the air heater and/or hot air flow in the food preparation chamber to become superheated steam suitable for frying, i.e. browning of the food ingredients through a Maillard reaction. Alternatively, the fluid may be a liquid, e.g. water. Upon its introduction in the food preparation chamber, the liquid may be vaporized by the air heater and/or hot air flow. So in contrast to the aforementioned embodiment, no separate heating means will be needed to increase the humidity in the food preparation chamber.

Preferably, the food preparation chamber may comprise an outer wall, an inner wall defining a food receiving space with an air inlet and an air discharge opening, and a circulation channel between the outer and inner walls for circulating air in the food receiving space via the circulation channel. Preferably, the fluid inlet is located in the circulation channel.

Therefore, the fluid is introduced into the flow of hot air upstream of the food ingredients so that the fluid flows through and/or around all of the food ingredients and contacts substantially all of its surface area to prevent any drying of the food ingredients.

Advantageously, the food preparation chamber may have an upper portion and a lower portion, one of the portions being releasable to enable access to the food preparation chamber.

Advantageously, the air-based fryer further comprises a fluid flow regulator to control the flow rate of fluid introduced into the flow of hot air from the fluid inlet. Therefore, the flow rate of fluid being introduced directly into the flow can be adjusted to achieve a predetermined humidity in the food preparation chamber.

Preferably, the fluid flow regulator may comprise a pump. The pump may pressurise the fluid which can enhance the distribution of the fluid into the flow.

Preferably, the fluid flow regulator may comprise a valve.

Advantageously, the fluid inlet may comprise a nozzle.

Therefore, the fluid is atomised so that it is more easily carried by the flow of hot air and more effectively increases the humidity of the flow. This helps to prevent fluid pooling at the bottom of the food preparation chamber.

Preferably, the fluid inlet may comprise a venturi pump to spray fluid into the circulating flow of hot air.

Therefore, the velocity of the flow of hot air is used to create a pressure drop which causes the fluid to spray into the flow. This removes the need for pressure creating device such as the pump to introduce fluid into the flow of hot air.

Preferably, the air-based fryer may comprise a reservoir to receive a supply of fluid to be introduced into the circulating flow of hot air from the fluid inlet.

Therefore, the air-based fryer can be operated for long periods of time without running out of fluid to be introduced directly into the flow.

Advantageously, the air-based fryer may comprise a controller to control the fluid flow regulator and a sensor positioned in the circulating flow of hot air to generate a signal indicative of the humidity of the circulating flow of hot air, the controller being responsive to the signal to control the fluid flow regulator to regulate the rate of flow of fluid to the fluid inlet to maintain a predetermined humidity.

Therefore, the air-based fryer can control the fluid flow regulator to vary the flow rate of fluid introduced into the flow to achieve and maintain the predetermined humidity required to perform the selected cooking method automatically.

Advantageously, the air heater may be configured to evaporate fluid in the hot air flow so that the mass of fluid introduced into the hot air flow is equal to the mass of fluid evaporated by the air heater.

Therefore, the humidity level in the food preparation chamber can be maintained and optimum cooking conditions can be provided. Furthermore, liquid is prevented exiting the food preparation chamber and the pooling of liquid is minimised.

Alternatively, the fluid flow rate may be kept at a constant, predetermined value. This value may depend, amongst others, on the size of the food preparation chamber, the amount and/or type of food to be prepared. For instance, with a food capacity of about 0.8 kg, the dosing rate may be between 5 and 7 ml/min, more preferably around 6 ml/min. Preferably, the air heater may comprise a deflector and the fluid inlet is positioned to direct fluid towards the deflector.

Therefore, all fluid introduced onto the deflector is evaporated into the flow of hot air by the air heater which increases the humidity of the flow effectively. It reduces the complexity of the air-based fryer by removing the need for spraying the fluid into the flow. According to another aspect of the invention, there is provided a method of preparing food ingredients in an air-based fryer comprising placing the food ingredients to be cooked into a food preparation chamber, heating air in the food preparation chamber, causing a flow of heated air to circulate in the food preparation chamber, and introducing a fluid directly into the circulating flow of hot air.

Therefore, food of a superior quality to known air-based fryers can be prepared in the air-based fryer of the present invention.

Preferably, the method may further comprise sensing the humidity of the circulating flow of hot air, regulating the flow of fluid in dependence on the sensed humidity to maintain the humidity of the circulating flow of hot air to within a predetermined range.

Therefore, the air-based fryer performs the selected cooking method automatically.

Preferably, the method may further comprise removing the food ingredients from the food preparation chamber, causing a flow of heated air to circulate in the food preparation chamber, and introducing a fluid directly into the circulating flow of hot air to clean the food preparation chamber.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
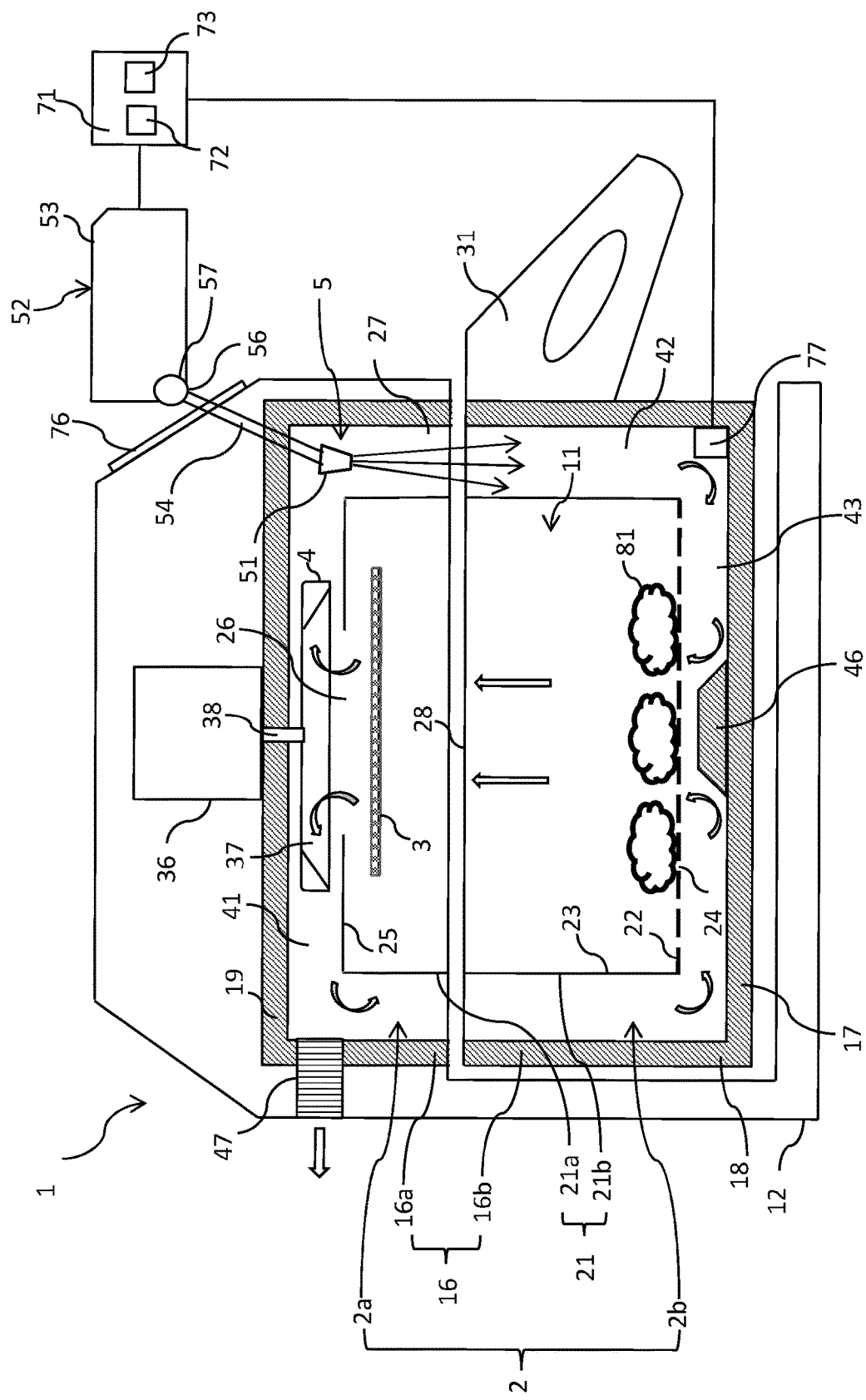
FIG. 1 shows a schematic cross-sectional side view of an air-based fryer of a first embodiment of the present invention.

FIG. 1 depicts a first embodiment of the present invention. In the first embodiment, there is provided an air based fryer 1 comprising a food preparation chamber 2. The air-based fryer 1 further comprises an air heater 3 for heating air in the food preparation chamber 2 and a fan 4 for circulating a flow of hot air in the food preparation chamber 2. The air-based fryer 1 further comprises a fluid inlet 5 for the introduction of a fluid directly into the circulating flow of hot air.

In the various drawings depicting the invention, the circulating a flow of hot air is illustrated by arrows. More particularly, the flow of hot air is shown to be circulated in the food preparation chamber, i.e. vertically upward through a central portion of the food preparation chamber 2 and returned along an interior periphery of the food preparation chamber 2, i.e. along outer wall 16. In alternative embodiments, the flow direction may be reversed. The air-based fryer 1 is configured to prepare food ingredients placed in a food receiving space 11 in the food preparation chamber 2 by heating, so as to heat and/or cook the food ingredients so they are ready for consumption. The air-based fryer 1 for example comprises an outer shell 12 extending around the food preparation chamber 2.

The food preparation chamber 2 may also comprise an outer wall 16 having a bottom part 17 and a side wall 18 which extends around and upstands from the bottom part 17. The outer wall 16 further comprises a top part 19 at the opposing end of the side wall 18 to the bottom part 17. The top part 19 extends inside the side wall 19 and substantially parallel to the bottom part 17 to form a sealed food preparation chamber 2.

The food preparation chamber 2 may also comprise an inner wall 21 disposed in the food preparation chamber 2 and defining the food receiving space 11 in which food ingredients are placed to be heated and/or cooked. The inner wall 21 comprises a bottom part 22 and a side wall 23 which extends around and upstands from the bottom part 22. The bottom part 22 of the inner wall 21 comprises an air inlet 24. The air inlet 24 may be, for example, an air-permeable section such as a mesh or a grid to allow the flow of hot air into the food receiving space 11, as will be explained hereinafter. Alternatively, the air inlet 24 may be formed by a central orifice, or multiple slits or orifices in the bottom part 22.

The inner wall 21 further comprises a top part 25 at the opposing end of the side wall 23 to the bottom part 22. The top part 25 extends inside the side wall 23 and substantially parallel to the bottom part 22. Optionally, the top part 25 comprises an orifice, shown centrally in FIG. 1, which forms an air discharge opening 26. However, it will be understood that the air discharge opening 26 may be formed off-centre or by more than one orifice. Furthermore, the air discharge opening 26 may be formed by slits (not shown) in the top part 25 or at the top of the side wall 23.

The outer wall 16 and the inner wall 21 extend substantially parallel to and are spaced from each other to define a circulation channel 27 therebetween. The circulation channel 27 acts to guide the flow of hot air, as will be explained hereinafter.

For example, the food preparation chamber 2 comprises an upper portion 2a and a lower portion 2b. The upper portion 2a of the food preparation chamber 2 is fixedly mounted to the outer shell 12 of the air-based fryer 1. The upper portion 2a of the food preparation chamber 2 may comprise an upper section 16a of the outer wall 16 and an upper section 21a of the inner wall 21. In an alternative embodiment, the upper section 21a of the inner wall 21 may be omitted.

The lower portion 2b of the food preparation chamber 2 is releasable from the upper portion 2a so that it is removable from the outer housing 12 of the air-based fryer 1 to enable access to the food receiving space 11. The lower portion 2b of the food preparation chamber 2 comprises a lower section 16b of the outer wall 16 and a lower section 21b of the inner wall 21 which extends around the bottom part 22. Therefore, the lower portion 2b of the food preparation chamber 2 forms a basket or basin shaped arrangement, with an upper opening 28 so that food ingredients can be placed in the food receiving space 11. The lower portion 2b is insertable into the outer shell 12 so that the lower section 16b of the outer wall 16 lies flush with the upper section 16a to form the food preparation chamber 2.

Optionally, the lower portion 2b of the food preparation chamber 2 may comprise a handle 31 on its external surface to aid removal of the lower portion 2b from the air-based fryer 1. In some embodiments, the lower portion 2b comprises a panel (not shown) between the outer surface of the lower section 16b and the handle 31 which lies flush with the outer shell 12 when the lower portion 2b is inserted into the air-based fryer 1.

Alternatively, the upper portion 2a may be releasably, e.g. hingedly connected to the lower portion 2b so as to enable access to the food receiving space 11.

The air heater 3 acts as a heat radiating means and is disposed in the upper portion 2a of the food preparation chamber 2. In an exemplary embodiment, as shown in FIG. 1, the air heater 3 is disposed inside the inner wall 21 below the air discharge opening 26. The air heater 3 is configured to heat the air flowing in the food receiving space 11. The air heater 3 heats the air such that any fluid introduced into the circulating flow of hot air is evaporated. The air heater 3 may also be configured to radiate heat into the food receiving space 11 towards food ingredients placed on the bottom part 22 of the inner wall 21. Alternatively, the air heater 3 may be disposed outside of the food receiving space 11 above the air discharging opening 26.

The air heater 3 may be any appropriate heating source, such as an electric heater, which can heat air to, for example, between roughly 100° C. and 250° C. by controlling the power supplied to the air heater. The air heater 3 is connected to a power source (not shown). The power source may be, for example, the electricity mains or batteries.

The fan 4 is also disposed in the food preparation chamber 2. In the present embodiment, shown in FIG. 1, the fan 4 is positioned outside the inner wall 21 and above both the air discharge opening 26 and the air heater 3. Optionally, the fan 4 is connected to a motor 36. The motor 36 is connected to the power supply (not shown). The motor 36 is configured to drive the fan 4 so that at least one blade 37 of the fan 4 rotates to cause an air flow. In the present embodiment, the motor 36 is positioned outside the food preparation chamber 2 and is connected to the fan 4 by a drive shaft 38 which extends through the outer wall 16.

The rotation of the at least one blade 37 of the fan 4 causes an air flow in the food preparation chamber 2. The fan 4 sucks air from the food receiving space 11 past the air heater 3, which heats the air flow, through the air discharge opening 26 by generating low pressure below the fan 4 and then expels a high pressure air flow of hot air into the circulation channel 27 defined between the outer and inner walls 16, 21.

The circulation channel 27 comprises a top section 41 which extends horizontally radial direction from the air discharge opening 26 out towards the outer wall 16. The circulation channel 27 further comprises a vertical section 42 and bottom section 43. The vertical section 42 extends vertically downwards from the outer periphery of the top section 41 and connects the top section to the bottom section 43. The bottom section 43 extends horizontally radial direction from the outer wall 3 towards the centre of the air inlet 24.

Air flowing out of the discharge section 26 into the top section 41 of the circulation channel 27 is redirected when it reaches the top part 19 of the outer wall 16. The air flow is redirected along the top section 41 of the circulation channel 27 until it reaches the side wall 18 of the outer wall 16 where it is redirected to flow downwards along the vertical section 42. When the air flow reaches the bottom of the vertical section 42 at the bottom part 17 of the outer wall 16 it is redirected to flow along the bottom section of 43 of the circulation channel 27 towards the air inlet 24.

Optionally, the top section 41 of the circulation channel 27 may be omitted. Optionally, the entire upper section 21a of the inner wall 21 may be omitted. In such case the circulation channel 27 extends in the lower portion 2b of the food preparation chamber only, between the lower sections 21b, 16b and bottom parts 22, 17 of the inner wall 21 and outer wall 16, respectively.

Optionally, the bottom part 17 of the outer wall 16 may comprise an air deflector 46 which extends into the bottom section 43 of the circulation channel 27. The air deflector 46 is configured to direct flow upwards and through the air inlet 24 into the food receiving space 11. The air deflector 46 may be, for example, generally cone-shaped or comprises arms (not shown). The height of the arms may increase as they extend or spiral in towards the centre of the bottom part 17 of the outer wall 16. Preferably, the arms are positioned so that they are rotationally symmetrical. The incline of the surface of the arms facing the flow may increase as the arms extend or spiral in towards the centre of the bottom part 17 of the outer wall 16.

Optionally, the outer wall 16 may comprise a vent 47 which defines an air outlet from the food preparation chamber 2 to outside the air-based fryer 1. Therefore, the vent 47 may also extend through the outer casing 12. The vent 47 is positioned proximate to the top of the food preparation chamber 2. In the present embodiment, the vent 47 is located in the side wall 18 of the outer wall 16 where the top and vertical sections 41, 42 of the circulation channel 27 meet. Preferably, the vent 47 comprises a shutter (not shown). The shutter can be opened to allow air in and out of the food preparation chamber 2 or can be closed so that the same air is circulated around the food preparation chamber 2.

The fan 4 and the vent 47 are positioned at the top end of the food preparation chamber 2 to reduce the contact of liquid discharged from the food ingredients in the food receiving space 11. Therefore, the discharged liquid is prevented from collecting on the at least one blade 37 of the fan 4 and being discharged out of the vent 47. The fan 4 and vent 47 may not be horizontally aligned to reduce the likelihood of liquid being discharged out of the vent 47. Furthermore, the air heater 3 being placed before the fan 4 helps to evaporate any liquid in the air flow leaving the food receiving space 11 to reduce the likelihood of liquid being discharged out of the vent 47.

Optionally, in alternative embodiments, the fan 4 may be a radial fan and the vent 47 may be formed in the outer wall 16 on a line extending in a radial direction to the axis of rotation of the at least one blade 37 of the fan 4.

Referring to FIG. 1, the fluid inlet 5 is configured to introduce fluid directly into the circulating flow of hot air and is positioned in the circulation channel 27 between the air discharge section 26 and the air inlet 24 of the food receiving space 11. Preferably, the fluid inlet 5 is positioned below the vent 47. Therefore, fluid introduced into the flow of hot air is not discharged out of the food preparation chamber 2 before reaching the food receiving space 11. In FIG. 1, there is only one fluid inlet 5 shown. However, it will be understood that there may be more than one fluid inlet 5 in the circulation channel 27. The fluid inlets 5 may be positioned symmetrically about the food receiving space 11.

The fluid inlet 5 is configured to introduce a fluid directly into the circulating flow of hot air. The fluid may be either a gas or a liquid. Examples of gases which may be introduced directly into the flow of hot air by the fluid inlet 5 include, but are not limited to, steam and smoke with an aroma. Examples of liquids which may be introduced directly into the flow of hot air by the fluid inlet 5 include, but are not limited to, water, a salt solution, a solution comprising spice solutes, oil solutions, and emulsions. In one embodiment, the fluid may be a cold mist which is created by an ultrasonic transducer (not shown).

Optionally, the fluid inlet 5 comprises a nozzle 51 configured to spray the fluid into the circulating flow of hot air. The nozzle 51 may be used to create an aerosol. The nozzle 51 creates an aerosol by spraying liquid droplets into the circulating flow of hot air. The nozzle 51 may comprise a convergent section (not shown) which increases the fluid pressure upstream of the nozzle outlet (not shown). In accordance with the principle of continuity, the fluid's velocity increases and the fluid pressure decreases as it passes though the convergent section. The kinetic energy of the fluid in the nozzle 51 is sufficient to break it up into droplets which are sprayed into the flow of hot air. The higher the fluid's velocity, the smaller the droplet size. The nozzle 51 may be, for example, but not limited to, a plain orifice nozzle, a flat fan nozzle, or a spiral surface-impingement nozzle. In an alternative embodiment, the fluid inlet 5 may comprise an orifice (not shown) instead of a nozzle 51.

Optionally, the fluid inlet may be a simple hole (not shown) in the outer wall 16 of the food preparation chamber 2 through which liquid is introduced directly into the circulating flow of hot air. The hole may be sized to introduce a constant flow rate of fluid directly into the circulating flow of hot air.

Optionally, the air-based fryer 1 may comprise a reservoir 52. The reservoir 52 is configured to receive a supply of fluid to be introduced into the circulating flow of hot air. The reservoir 52 supplies the fluid to the fluid inlet 5 for introduction into the flow of hot air. The reservoir 52 may preferably be formed integrally with the air-based fryer 1. That is, the reservoir 52 is located in the outer shell 12. In alternative embodiments the reservoir 52 may be a separate unit (as illustrated). The reservoir 52 may have a closable opening (not shown) so that the reservoir 52 can be re-filled with fluid. The reservoir 52 may contain a tank 53 which is used to contain the fluid. The reservoir 52 may be connected to the fluid inlet 5 by a connecting tube 54. More than one connecting tube 54 may extend from the reservoir 52 to each of the fluid inlets 5 arranged in the circulation channel 27. As illustrated in FIG. 1, the reservoir 52 may be arranged above the food preparation chamber or at least above the fluid inlet(s) 5. This allows the fluid to be transported to the fluid inlet by gravity, thereby removing the need for a pump.

Optionally, the air-based fryer 1 may further comprise a fluid flow regulator 56 which is configured to control the flow rate of fluid introduced into the flow of hot air from the fluid inlet 5. The fluid flow regulator 56 may be configured to provide a constant mass flow rate of fluid to the fluid inlet 5 to be introduced directly into the circulating flow of hot air. Therefore, the fluid flow regulator 56 restricts the flow of fluid and provides a predetermined fixed humidity level in the food preparation chamber 2. The fixed humidity level may be specific to one model of the air-based fryer. For example, the fluid flow regulator 56 may comprise a hole (not shown) which regulates the flow rate of a fluid under the influence of gravity. Alternatively, the fluid flow regulator 56 may be adjustable to vary the flow rate of fluid to the fluid inlet 5, as will be described hereinafter. In such an embodiment, the humidity level in the food preparation chamber 2 is not fixed and can be varied by adjusting the fluid flow regulator 56. The fluid flow regulator 56 may be manually adjustable or may be adjusted automatically to achieve a predetermined humidity level, as will be described hereinafter.

The fluid flow regulator 56 may comprises a pump 57. The pump 57 may be located at the outlet of the reservoir 52 and configured to pump fluid from the reservoir along the connecting tube 54 under pressure to the fluid inlet 5, as shown in FIG. 1. The pump 57 may be, for example, but not limited to, a peristaltic pump, a membrane pump, or a solenoid pump.

Figure 2:
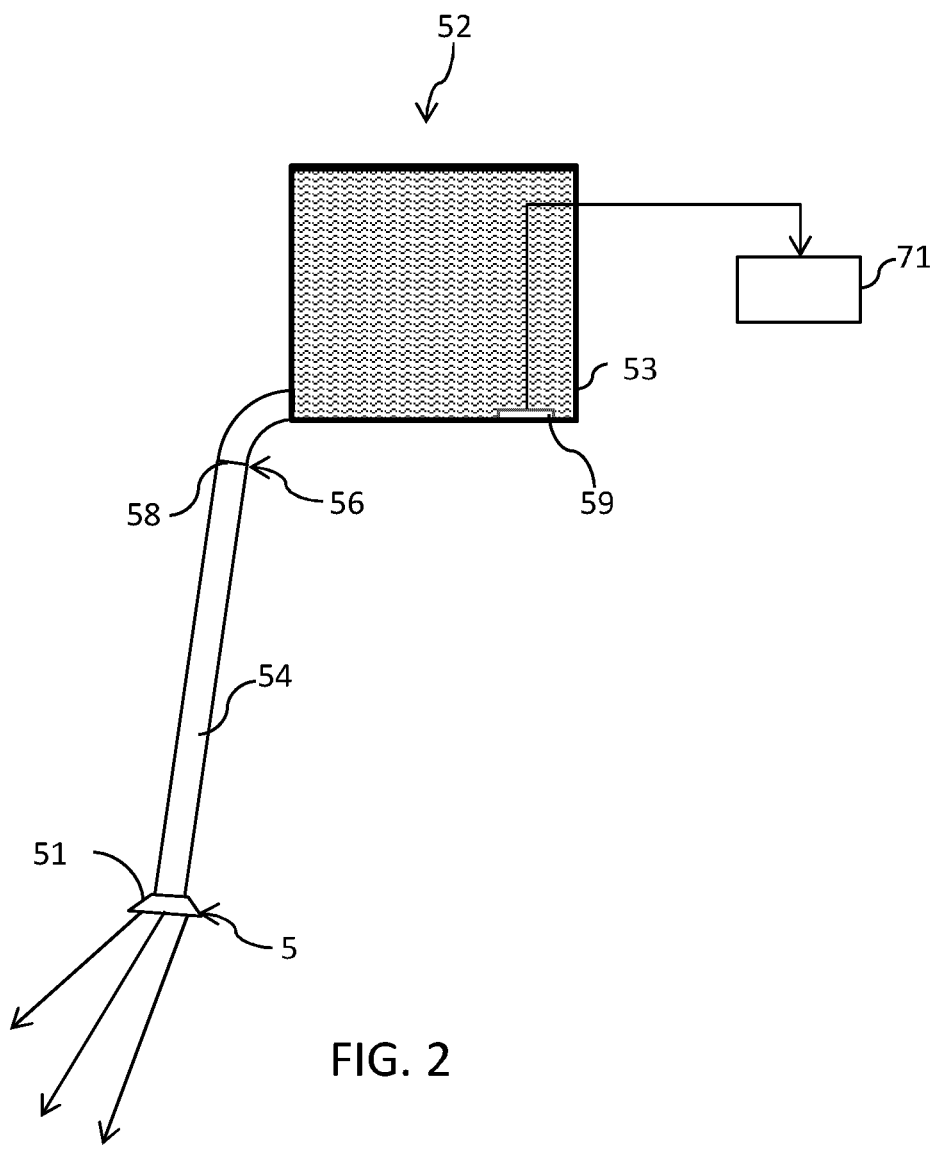
FIG. 2 shows a schematic cross-sectional side view of a reservoir, fluid flow regulator, and fluid inlet of the air-based fryer of a second embodiment of the present invention.

FIG. 2 shows a schematic cross section of a second embodiment of the reservoir 52, fluid flow regulator 56, and fluid inlet 5. As in FIG. 1, the fluid inlet 5 comprises a nozzle 51 which is connected to the reservoir 52 by the connecting tube 54. However, in the second embodiment, the fluid flow regulator comprises a valve 58. The valve 58 is opened to allow fluid from the reservoir 52 to flow to the nozzle 51 at the other end of the connecting tube 54. It will be understood that an alternative embodiment may comprise the pump 57, shown in FIG. 1, and the valve 58 to regulate the flow rate of fluid introduced into the flow of hot air by the fluid inlet 5.

Optionally, the reservoir 52 may comprise a fluid sensor 59 configured to detect the amount of fluid in the reservoir 52. Therefore, the air-based fryer 1 can alert the user when the level of fluid is low so that the reservoir 52 can be re-filled.

In an embodiment in which steam is the fluid to be introduced directly into the flow of hot air, the reservoir 52 may optionally comprise a heater (not shown) configured to heat liquid water until it evaporates. In such an embodiment, the connecting tube 54 would be connected to the top of the tank 53 rather than the bottom as shown in FIG. 2.

Figure 3:
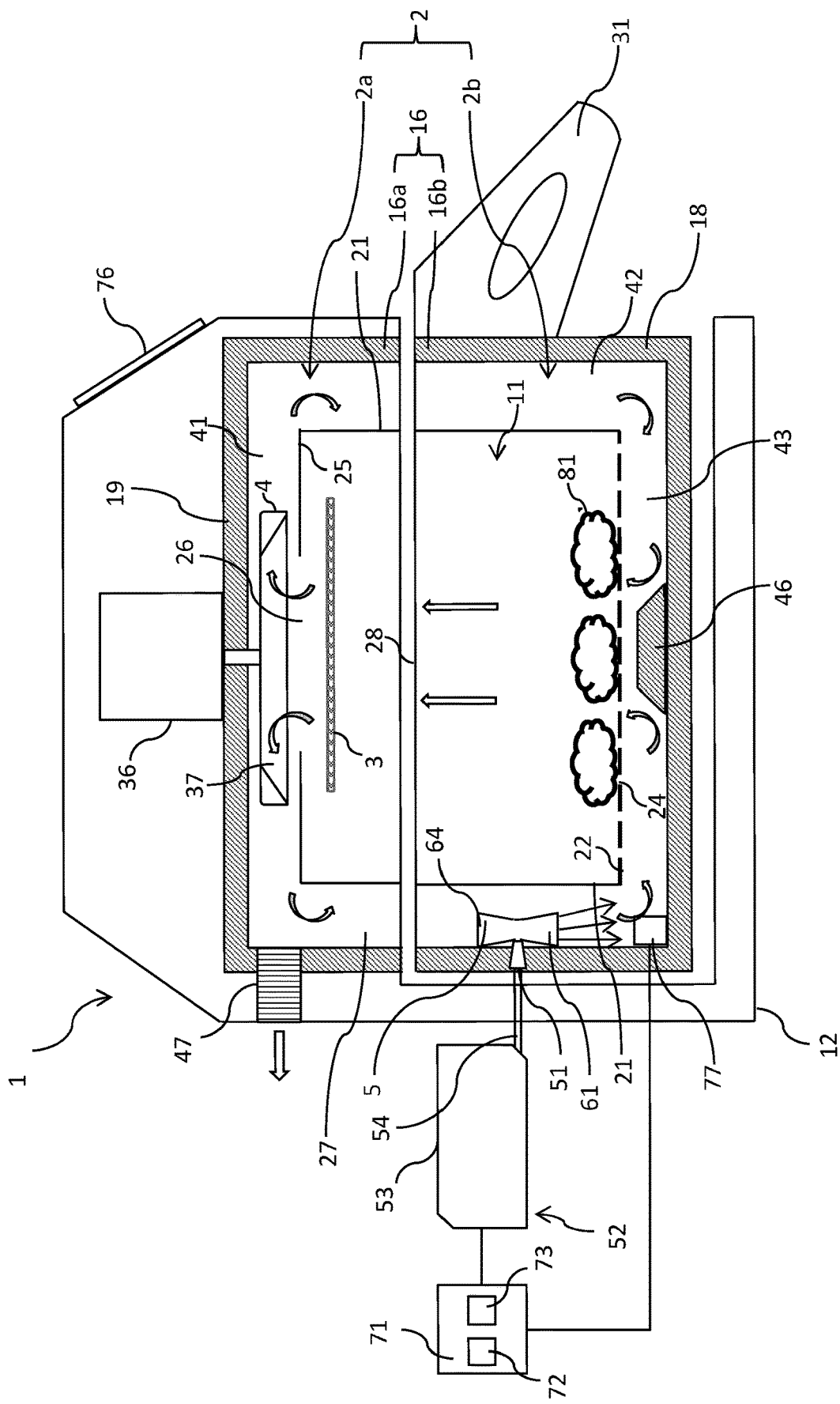
FIG. 3 shows a schematic cross-sectional side view of the air-based fryer of a third embodiment of the invention.

An alternative embodiment of the air-based fryer 1 is shown in FIG. 3. The air-based fryer 1 is generally the same as the embodiment described above and so a detailed description will be omitted herein. Furthermore, features and components of the air-based fryer 1 will retain the same terminology and reference numerals.

In the embodiment shown in FIG. 3, the fluid inlet 5 of the air-based fryer 1 optionally comprises a venturi pump 61 which is configured to spray fluid directly into the circulating flow of hot air. The venturi pump 61 is positioned in the vertical section 42 of the circulation channel 27. The venturi pump 61 is used to introduce fluid directly into the circulating flow of hot air by creating an aerosol.

FIG. 4 shows a detailed view of the venturi pump 61 used as the fluid inlet 5 in the embodiment of the air-based fryer 1 shown in FIG. 3 with the nozzle 51 omitted. The venturi pump 61 comprises a convergent section 62 and a divergent section 63. The convergent section 62 is upstream of the divergent section 63. The convergent section 62 comprises an inlet 64 configured to allow (part of) the circulating flow of hot air in the circulation channel 27, shown in FIG. 3, to enter the venturi pump 61. The connecting tube 54 opens into the venturi pump 61 through a fluid port 65 at its throat 66. The throat 66 is the point where the convergent section 62 and divergent section 63 meet and is the section of the venturi pump 61 that has the smallest cross-sectional area. The divergent section 63 comprises an outlet 67 to allow the mixture circulating flow of hot air and fluid introduced into the flow to exit the venturi pump 61, as will be explained hereinafter.

Referring now to FIG. 3 and FIG. 4, the circulating flow of hot air is forced along the circulation channel 27 by the rotating fan 4. When the flow reaches the venturi pump 61 it is split into two; one flow which bypasses the venturi pump 61 and another which enters the inlet 64 of the venturi pump 61. As the hot air flows through the convergent section 62, the cross-sectional area of the venturi pump 61 reduces. In order to maintain continuity, the reduction in the cross-section area of the convergent section 62 results in an increase in the velocity of the hot air flow through the convergent section 62 as the mass flow rate of the hot air is constant. Therefore, in order to maintain the conservation of energy, the increase is velocity of the hot air flow is accompanied by a decrease in the pressure of the hot air flow.

The reduction in pressure is greatest at the throat 66 because this is where the hot air is flow at its highest velocity. The reduction in pressure causes a partial vacuum to be created in the fluid inlet 5 and therefore, causes fluid to be sucked from the fluid port 65 directly into the hot air flow within the venturi pump 61. The mixture of hot air and fluid the travels through the divergent section 63 of the venturi pump 61 where the pressure is recovered, accompanied by a deceleration of the flow, and out of the outlet 67 (illustrated by dotted arrow D2) to re-join the hot air flow that bypassed the venturi pump 61.

Optionally, as shown in FIG. 3, the nozzle 51 may act to regulate the flow of fluid into the fluid port 65 of the venturi pump 61. The nozzle 51 is positioned between the connecting tube 54 and the venturi pump 61 to regulate the rate flow of fluid that is introduced into the circulating flow of hot air. The nozzle 51 also helps to ensure that the fluid is introduced directly into the flow of hot air as a spray. It will be understood that the fluid flow regulator 56 may comprise any combination of pump, valve, and nozzle. Preferably, the venturi pump 61 is aligned such that it is parallel to the direction of flow of the circulating hot air. This helps to reduce, if not prevent, the generation of noise created when air flows over an open end of a tube.

The venturi pump 61 is positioned in the lower portion 2*b* of the food preparation chamber 2 and fixed to the lower section 16*b* of the outer wall 16. The venturi pump 61 is detachable from the connecting tube 54 which delivers fluid from the reservoir 52. Therefore, the lower portion 2*b* of the food preparation chamber 2 can be slidably removed from the outer shell 12 to enable a user access to the food receiving space 11.

Preferably, the connection (not shown) between the venturi pump 61 and connecting tube 54 is a push fit connection so that when the lower portion 2*b* is slid into or out of the outer shell 12 the venturi pump 61 is automatically disconnected or reconnected to the connecting tube 54. The connecting tube 54 is fixedly mounted in outer shell 12 of the air-based fryer 1. The venturi pump 61 may comprise a connection portion (not shown) which is fixedly mounted and extends through the outer wall 16 of the food preparation chamber 2 to connect to the connecting tube 54.

Preferably, a valve (not shown in FIG. 3) is present at the end of the connecting tube 54 proximate to the venturi pump 61 to prevent leakages when the venturi pump 61 is disconnected. An advantage of the detaching the venturi pump 61 is that the lower portion 2*b* of the food preparation chamber 2 can be removed from the rest of the air-based fryer and cleaned easily. Alternatively, the connecting tube 54 may be flexible such that it can straighten as the lower portion 2*b* of the food preparation chamber is slid out and collapse when the lower portion is urged back into the outer shell 12.

Optionally, the air-based fryer 1 further comprises a controller 71, as shown in FIG. 1 and FIG. 3. The controller 71 is configured to control the fluid flow regulator 56. The controller 71 may be used to control the flow rate of the fluid or the humidity in the food receiving space 11. The controller 71 may also be adapted to control the air heater 3 and the fan 4 to circulate the flow of hot air to the food ingredients.

The controller 71 may comprise a processor 72 which may be implemented as, for example, but not limited to, a suitably programmed micro-processor or micro-controller or multiple micro-processors or micro-controllers. The controller may further comprise a memory 73. The memory 73 may take any suitable form. The memory 73 may include a non-volatile memory and/or RAM. The non-volatile memory may include read only memory (ROM), a hard disk drive (HDD), or a solid state drive (SSD). The memory stored, amongst other things, an operating system for controlling the air-based fryer 1, especially the air heater 3, the fan 4, and the fluid flow regulator 56. The RAM is used by the processor 72 for the temporary storage of data.

Optionally, the air-based fryer 1 may comprise a user interface 76, as shown in FIG. 1 and FIG. 3. The user interface 76 is configured to allow the user to operate the air-based fryer 1 easily. The user interface 76 may allow the user to operate the controller 71 to control the air heater 3, fan 4, and/or fluid flow regulator 56 based on predetermined programs. The user interface 76 may comprise knobs (not shown) to adjust the temperature of the air heater 3, the rotational speed of the fan 4, the flow rate of fluid through the fluid flow regulator 56, and/or a knob to choose between predetermined cooking methods. The knobs may allow a user to choose between predetermined values or select any value in a range. Alternatively, the user interface may comprise buttons (not shown) or a touchscreen (not shown).

In one embodiment, as shown in FIG. 1 and FIG. 3, the user interface 76 allows the user to select a flow rate of fluid trough the fluid flow regulator 56. Therefore, the fluid flow regulator 56 must be adjustable. That is, the pump 57, shown in FIG. 1, can vary the rate at which it pumps fluid from the reservoir 52 to the fluid inlet 5 by, for example, varying the rate at which it reciprocates or rotates. The valve 58, shown in the embodiment of FIG. 2, can vary the fluid flow rate by adjusting the amount of time it is open for or the extent to which it opens. The nozzle 51, shown as the fluid flow regulator 56 in FIG. 3, may vary the fluid flow rate of fluid from the reservoir 52 to the fluid inlet 5 by varying the size of its orifice (not shown). The larger the orifice, the larger the flow rate.

Optionally, the air-based fryer 1 may further comprise a humidity sensor 77, as shown in FIG. 1 and FIG. 3. The humidity sensor 77 is configured to detect the humidity level of the circulating flow of hot air and send a signal indicative of the humidity level to the controller 71. The humidity sensor 77 may be positioned in the circulation channel 27 below the fluid inlet 5. Preferably, the humidity sensor 77 is located at a distance far enough downstream of the fluid inlet 5 to allow the fluid introduce into the circulation channel 27 to have substantially uniformly mixed with the circulating flow of hot air. One humidity sensor 77 may be disposed below each fluid inlet 5. Alternatively, the humidity sensor 77 may be positioned in the food receiving space 11. The humidity sensor 77 may measure, for example, but not limited to, absolute humidity or relative humidity.

In one embodiment of the air-based fryer 1, the controller 71 may interpret the signal received from the humidity sensor 77 and display the humidity level on a display (not shown) of the user interface 76. The user may then manually adjust the settings to achieve the desired humidity in the food receiving chamber 11. Alternatively, in another embodiment, the user may select a desired or predetermined humidity value or range using the user interface 76. The controller 71 then monitors the signal generated by the humidity sensor 77. The controller 71 is responsive to the signal and controls the fluid flow regulator 56 to regulate the flow of fluid to the fluid inlet 5 to maintain the predetermined humidity range.

The absolute humidity level in the food preparation chamber 2 is strongly influenced by the amount of water in the circulating flow of hot air and the flow rate of water introduced directly into the flow of the hot air by the fluid inlet 5. In one embodiment of the present invention, it has been found that to create and maintain the maximum absolute humidity in the food preparation chamber 2 when the shutter (not shown) of the vent 47 is open, the fluid flow regulator 56 must supply water to the fluid inlet 5 at a rate of approximately 10 g/min. The flow rate compensates for the fluid exiting the food preparation chamber 2 through the vent 47 and any leakage in the air-based fryer 1 caused by housing untidiness.

The absolute humidity level of steam in the food preparation chamber 2 can be controlled by the fluid flow regulator 56. For example, to achieve 25% of the maximum humidity a flow rate of 3 g/min may be required, to achieve 50% of the maximum humidity a flow rate of 5 g/min may be required, to achieve 75% of the maximum humidity a flow rate of 7 g/min may be required, and to achieve 100% of the maximum humidity a flow rate of 10 g/min may be required when the shutter (not shown) of the vent 47 is fully open. Preferably, to maintain a superheated steam environment in the temperature range of 100° C. to 200° C., a flow rate of between 5 g/min and 10 g/min is required.

Optionally, the controller 71 may be configured to regulate the rate of flow of fluid to the fluid inlet 5 so that the mass of fluid introduced into the hot air flow is equal to the mass of fluid evaporated by the air heater 3. Therefore, by reducing the amount of fluid introduced into the hot air flow, all the fluid introduced into the circulating hot air flow is evaporated. Furthermore, no liquid escapes the food receiving space 11 to be discharged through the vent 47, as previously described. However, this may result in a humidity level below the predetermined range and inferior cooking results. Alternatively, the controller 71 may be configured to regulate the temperature of the air heater 3 so that the mass of fluid evaporated by the air heater is equal to the mass of fluid introduced into the hot air flow. However, this may result in a temperature in the food receiving space 11 which is too high for cooking and inferior cooking results.

Therefore, it will be understood that the controller 71 may be configured to regulate both the rate of flow of fluid to the fluid inlet 5 and the temperature of the air heater 3 to ensure optimum cooking conditions and the evaporation of all the liquid leaving the food receiving space 11 via the air discharge opening 26.

In a further embodiment (not shown), the air-based fryer 1 may comprise a humidity sensor 77 in the circulation channel 27 above the fluid inlet 5 to generate a signal indicative of the humidity of the hot air flow once it has passed the air heater 3 to determine how effective the air heater 3 has been at evaporating all the liquid in the circulating flow of hot air that has left the food receiving space 11.

Furthermore, the controller 71 may optionally be configured to control the fan 4 such that the rotational speed of the fan can be varied to produce different cooking results. It will be understood that the controller 71 may also control the time periods for which the air heater 3, fan 4, and fluid flow regulator 56 are activated based on predetermined programs stored in the memory 73 or based on inputs made via the user interface 76 so that various different cooking methods may be followed depending on the type of food ingredients in the food receiving chamber 11 and the type of cooking desired.

In some embodiments, the air heater 3 may comprise a deflector (not shown). In such an embodiment, the fluid inlet 5 is positioned to direct fluid towards the deflector. The deflector is heated by the air heater 3 so that when fluid contacts the deflector the fluid is evaporated and carried to the food receiving space 11 by the circulating flow of hot air created by the rotating fan 4.

Figure 4:
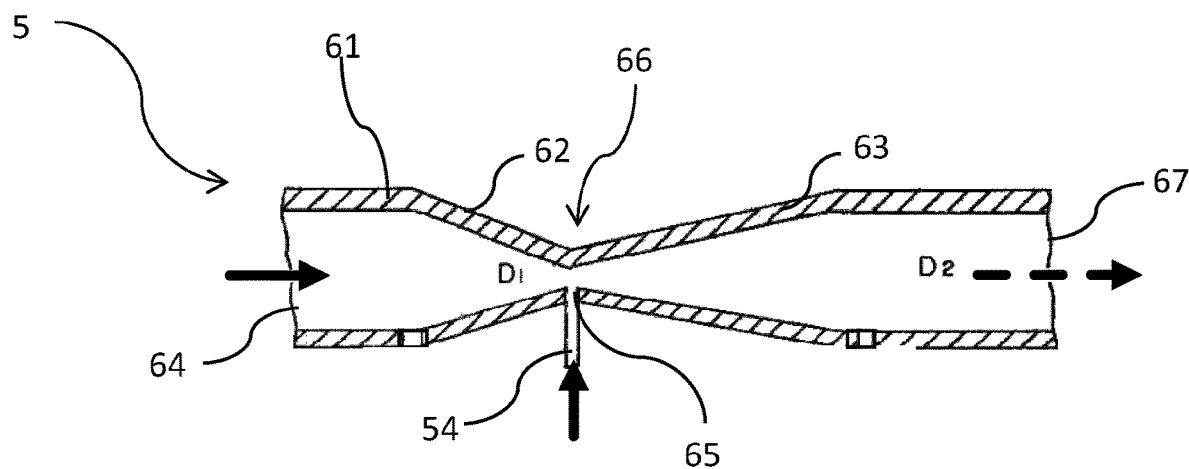
FIG. 4 shows an enlarged schematic cross-sectional side view of a venturi pump of the air-based fryer shown in FIG. 3 with a nozzle omitted.
Figure 5:
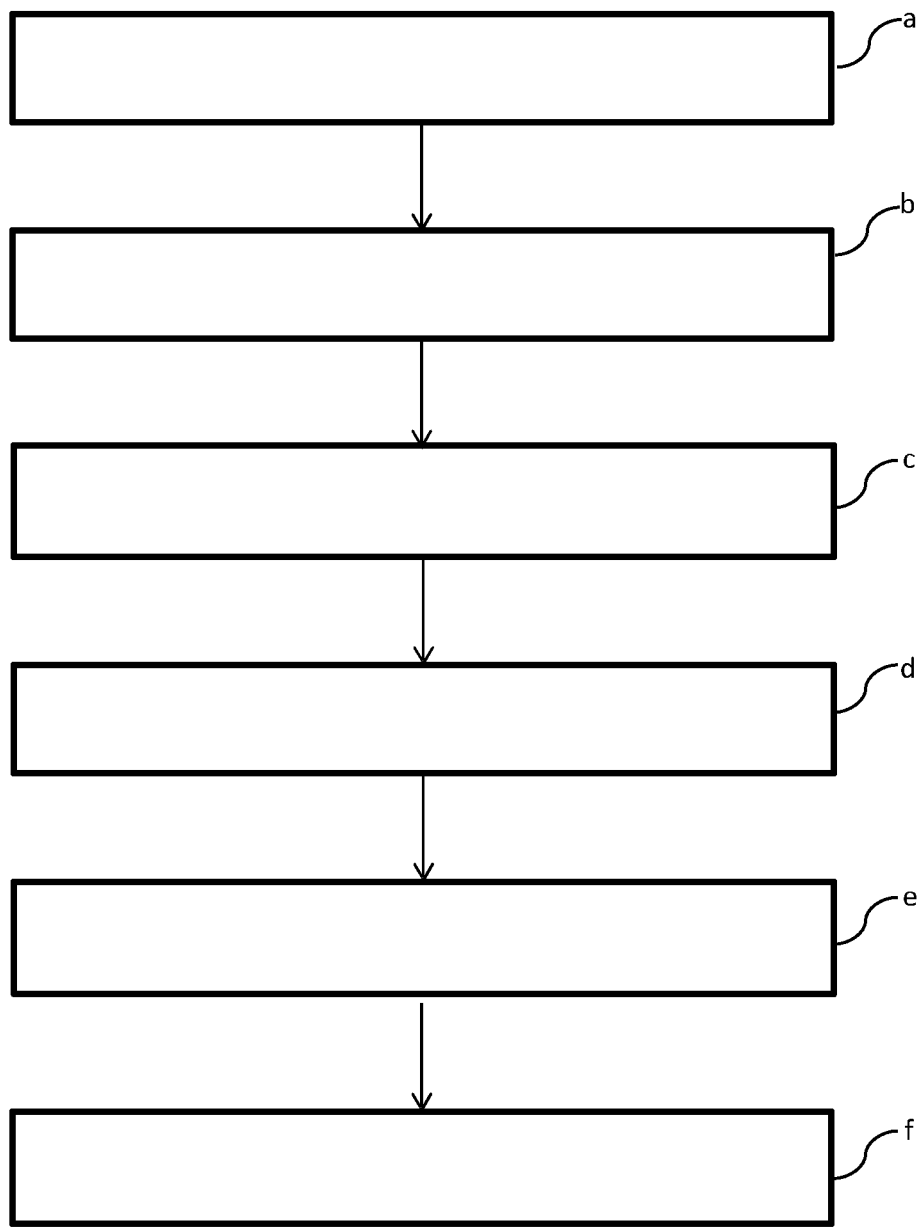
FIG. 5 shows a flow diagram depicting the method steps for preparing food ingredients using the air-based fryer according to the invention.

A method of preparing food ingredients in the air based fryer 1 will now be described with reference to FIG. 3 to FIG. 5. Referring to FIG. 5, the method comprises the step of:
  placing food ingredients to be cooked into the food preparation chamber 2 (step a),
  heating air in the food preparation chamber 2 (step b),
  causing a flow of heated air to circulate in the food preparation chamber 2 (step c), and
  introducing fluid directly into the circulating flow of hot air (step d).
Optionally, the method may further comprises the steps of:
  sensing the humidity of the flow of hot air (step e), and
  regulating the flow of fluid in dependence on the sensed humidity to maintain the humidity of the circulating flow of hot air to within a predetermined range (step f). The range for the humidity is 0% to 100%, and preferably 50% to 100%. Preferably, the predetermined range of humidity is achieved at standard atmospheric pressure and in the cooking temperature range of 100°

C. to 200° C. Thus, superheated steam will be generated, suitable for frying the food ingredients, more particularly, suitable to bring about ae Maillard reaction that will give the food ingredients a fried taste and brown colour.

Referring to FIG. 3, when a user cooks food ingredients with the air-based fryer 1, the first action is to take a hold of the handle 31 and pull the lower portion 2b of the food preparation chamber 2 away from the upper portion 2a and out of the outer shell 12 to get access to the food receiving space 11 via the upper opening 28 of the lower portion 2b. The movement of the lower portion 2b causes the connecting portion (not shown) of the venturi pump 61 to disconnect from the connecting tube 54. The user places food ingredients 81 in the food receiving space 11 on the bottom part 22 of the inner wall 21 through the upper opening 28 of the lower portion 2b.

Once the food ingredients have been placed in the food receiving space 11 the user slides the lower portion 2b back into the outer shell 12 so that the venturi pump 61 reconnects to the connecting tube 54 and the lower section 16b of the outer wall 16 of the food preparation chamber 2 lies flush with the upper section 16a to create a substantially sealed chamber. The user then selects the cooking method to be followed by the air-based fryer 1 using the user interface 76, as explained above.

The controller 71 sends a signal to the motor 36 to activate which causes the at least one blade 37 of the fan 4 to rotate and cause a flow to circulate in the food preparation chamber 2.

The controller 71 also sends a signal to the air heater 3 to activate it so that the air heater 3 heats up to the temperature desired by the user's input on the user interface 76. The air heater 3 heats the food ingredients 81 in the food receiving space 11 by radiation and also heats the flow of air as it is sucked out of the air discharge opening 26 in the top part 25 of the inner wall 21 by the rotating fan 4. The temperature of the air heater 3 is controlled by the controller 71 so that the flow of hot air is at the correct temperature to have the desired cooking effect on the food ingredients 81 and the liquid sucked towards the air discharge opening 26 is evaporated before it leaves the food receiving space 11 without having an adverse effect on the food ingredients 81.

The flow of hot air exits the food receiving space 11 through the air discharge opening 26 and is deflected along the top section 41 of the circulation channel 27 due to the pressure gradient caused by the rotating fan 4 and the boundary formed by the top part 19 of the outer wall 16. The flow of hot air travels horizontally in a radial direction towards the sidewall 18 of the outer wall 16 where some of the hot air exits through the vent 47 and the rest of the flow is directed into the vertical section 42 of the circulation channel 27.

The circulating flow of hot air in the circulation channel 27 has a swirl component due to the rotation of fan 4. Therefore, the venturi pump 61 in the vertical section 42 of the circulation channel 27 is positioned at an angle to the vertical to substantially match the angle of the flow to reduce, if not prevent, the noise generation caused by turbulence of the flow flowing across the inlet 64 of the venturi pump 61. The circulating flow of hot air is split into a portion that bypasses the venturi pump 61 and a portion which enters the inlet 64. Referring now to FIG. 4, the air which enters the inlet 64 flows into the convergent section 62 of the venturi pump 61 which converges down to the throat 66, the point of minimum cross-sectional area, which causes the flow of hot air in the venturi pump 61 to accelerate to this point and a decrease in pressure. The decrease in pressure sucks fluid, for example, a spice solution, from the connecting tube 54 and nozzle 51, shown in FIG. 3, through the fluid port 65 and into the flow of hot air. As the mixture of fluid and hot air travels from the throat 66 it enters the divergent section 63 where the velocity of the flow is reduced and pressure recovered before it exits the outlet and mixes with the portion of the flow of hot air that bypassed the venturi pump 61.

Referring back to FIG. 3, the flow of hot air and fluid is then directed along the bottom section 43 of the circulation channel 27 and forced upwards through the mesh forming the air inlet 24 to the food receiving space 11 by the air deflector 46. Once in the food receiving space 11 the flow of hot air and fluid flows all around the food ingredients 81 delivering a combination of heat, moisture, and/or flavour to cook the food ingredients 81 as desired.

As the mixture of hot air and fluid flows from the outlet of the venturi pump 61 to the air heater 3 in the food receiving space 11 it flows past the humidity sensor 77. The humidity sensor 77 generates a signal indicative of the humidity of the flow and sends it to the controller 71. The controller 71 monitors the signal and determines if the humidity is in the predetermined range defined by the user. If the humidity is too high, the controller 71 controls the nozzle 51 to reduce the size of the orifice (not shown) through which fluid flows to reduce the flow rate of fluid introduced into the flow and therefore, the humidity. If the humidity is too low, the controller 71 controls the nozzle 51 to increase the size of the orifice (not shown) through which fluid flows to increase the flow rate of fluid introduced into the flow and therefore, the humidity.

In some embodiments, another humidity sensor 77 may be places between the air heater 3 and the vent 47 or the inlet 64 of the venturi pump 61. In such an embodiment, when the humidity sensor positioned after the air heater 3 generates a signal indicative of a higher humidity than is acceptable, the controller 71 will control the air heater 3 to increase its temperature to ensure liquid flowing towards the air discharge opening 26 is evaporated. The controller 71 will continue to carry out the desired cooking method as instructed by the user via the user interface 76 and will control the air heater 3, fan 4, and fluid flow regulator 56 accordingly.

Optionally (not shown on the flow chart of FIG. 5), the method may further comprise the steps of:
  removing the food ingredients from the food preparation chamber 2 (once cooked). Practically speaking, this implicitly implies that the user will first have to close the shutter (not shown) of the vent 47.
  causing a flow of heated air to circulate in the food preparation chamber 2. This step implies turning-on the air heater and the fan.
  introducing a fluid directly into the circulating flow of hot air to clean the food preparation chamber 2. Therefore, food residue (such as oil) is heated and washed to the bottom of the food preparation chamber 2. Due to the hot and humid conditions in the food preparation chamber 2, the food residue becomes easier to wipe away once the method has been carried out.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the spirit and scope of the technique approaches of the present invention, which will also fall into the protective scope of the claims of the present invention. In the claims, the word "comprising" does not exclude other elements or steps, and the indefinite article "a" or "an" does not exclude a plurality. Any reference signs in the claims should not be construed as limiting the scope.

The invention claimed is:

1. An air-based fryer for preparing food ingredients using a high speed hot air flow which flows through and/or around all said food ingredients to provide all round frying, the air-based fryer comprising:
   a food preparation chamber to receive said food ingredients;
   an air heater for heating air in the food preparation chamber;
   a fan for circulating a flow of hot air in the food preparation chamber; and
   a fluid inlet for the introduction of a fluid directly into said circulating flow of hot air, and
   wherein the circulation of hot air is circulated in the food preparation chamber vertically upward through a central portion of the food preparation chamber and returned along an inner periphery of the food preparation chamber along an outer wall; and
   wherein the food preparation chamber comprises an outer wall, an inner wall defining a food receiving space wherein the bottom part of the inner wall comprises an air inlet and an air discharge opening, and wherein a top part of the inner wall comprises an air discharge opening, the food preparation chamber further comprising a circulation channel between the outer wall and inner wall for circulating air in the food receiving space via said circulation channel.

2. The air-based fryer according to claim 1, further comprising a fluid flow regulator to control the flow rate of fluid introduced into the flow of hot air from said fluid inlet.

3. The air-based fryer according to claim 2, wherein the fluid flow regulator comprises a pump.

4. The air-based fryer according to claim 2, wherein the fluid flow regulator comprises a valve.

5. The air-based fryer according to claim 1, wherein the fluid inlet comprises a nozzle arranged to create an aerosol.

6. The air-based fryer according to claim 1, wherein the fluid inlet comprises a venturi pump to spray fluid into the circulating flow of hot air.

7. The air-based fryer according to claim 1, comprising a reservoir to receive a supply of fluid to be introduced into said circulating flow of hot air from said fluid inlet.

8. The air-based fryer according to claim 2, comprising a controller to control the fluid flow regulator and a sensor positioned in the circulating flow of hot air to generate a signal indicative of the humidity of said circulating flow of hot air, the controller being responsive to said signal to control the fluid flow regulator to regulate the rate of flow of fluid to the fluid inlet to maintain a predetermined humidity range.

9. The air-based fryer according to claim 8, wherein the air heater is configured to evaporate fluid in the hot air flow so that the mass of fluid introduced into the hot air flow is equal to the mass of fluid evaporated by the air heater.

10. The air-based fryer according to claim 1, wherein the fluid is water or steam and the air heater is configured to heat up said water or steam to superheated steam with a temperature above 100° C., for instance above 120° C., more preferably above 130° C.

11. The air-based fryer according to claim 1, wherein the fluid inlet is located in the circulation channel.

12. A method of preparing food ingredients in an air-based fryer using a high speed hot air flow which flows through and/or around all said food ingredients to provide all round frying, the method comprising:
   (a) placing food ingredients to be cooked into a food preparation chamber;
   (b) heating air in the food preparation chamber;
   (c) causing a flow of heated air to circulate in the food preparation chamber through said food ingredients that have been placed therein, wherein the circulation of hot air is circulated in the food preparation chamber vertically upward through a central portion of the food preparation chamber and returned along an inner periphery of the food preparation chamber along an outer wall, and
   (d) introducing a fluid directly into the circulating flow of hot air;
   wherein the fan is disposed in the food preparation chamber outside the inner wall and above both an air discharge opening and an air heater.

13. The method according to claim 12, further comprising:
   (e) sensing the humidity of the circulating flow of hot air,
   (f) regulating the flow of fluid in dependence on the sensed humidity to maintain the humidity of the circulating flow of hot air to within a predetermined range.

14. The method according to claim 12, further comprising:
   (g) removing the food ingredients from the food preparation chamber,
   (h) causing a flow of heated air to circulate in the food preparation chamber, and
   (i) introducing a fluid directly into the circulating flow of hot air to clean the food preparation chamber.

15. The air-based fryer according to claim 11, wherein the fan is disposed in the food preparation chamber outside the inner wall and above both the air discharge opening and the air heater.

16. The method according to claim 12, wherein the step of causing a flow of heated air to circulate in the food preparation chamber through said food ingredients that have been placed therein further comprises sucking air from the food receiving space past the air heater through the air discharge opening by generating low pressure below the fan and expelling a high pressure air flow of hot air into the circulation channel.

17. The air-based fryer according to claim 2, wherein the fluid flow regulator comprises a venturi pump arranged to spray fluid into the circulating flow of hot air.

18. An air-based fryer comprising:
   a food preparation chamber configured to receive food ingredients;
   an air heater for heating air in the food preparation chamber;
   a fan for circulating a flow of hot air in the food preparation chamber; and
   a fluid inlet for the introduction of a fluid directly into said circulating flow of hot air, and
   wherein the circulation of hot air is circulated in the food preparation chamber through a central portion of the food preparation chamber and returned along an outer wall of the food preparation chamber; and
   wherein the food preparation chamber further comprises an inner wall defining a food receiving space wherein the bottom part of the inner wall comprises an air inlet and an air discharge opening, and wherein a top part of the inner wall comprises an air discharge opening, the food preparation chamber further comprising a circulation channel between the outer wall and inner wall for circulating air in the food receiving space via said circulation channel.

19. The air-based fryer of claim 18, further comprising a fluid flow regulator to control the flow rate of fluid introduced into the flow of hot air from said fluid inlet.

20. The air-based fryer of claim 18, comprising a reservoir to receive a supply of fluid to be introduced into said circulating flow of hot air from said fluid inlet.

* * * * *